(12) United States Patent
Lee

(10) Patent No.: US 7,986,442 B2
(45) Date of Patent: Jul. 26, 2011

(54) APPARATUS AND METHOD TO GENERATE A HALFTONING SCREEN AND IMAGE FORMING APPARATUS FOR SAME

(75) Inventor: Hae-kee Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 774 days.

(21) Appl. No.: 11/968,784

(22) Filed: Jan. 3, 2008

(65) Prior Publication Data

US 2009/0015870 A1    Jan. 15, 2009

(30) Foreign Application Priority Data

Jul. 9, 2007  (KR) .......................... 10-2007-0068730

(51) Int. Cl.
*H04N 1/405* (2006.01)

(52) U.S. Cl. ...................................... 358/3.09; 358/3.06

(58) Field of Classification Search .................... 358/1.9, 358/2.1, 1.2, 3.01–3.06, 3.09–3.12, 3.14, 358/3.2–3.22, 3.24; 382/237
See application file for complete search history.

(56) References Cited

U.S. PATENT DOCUMENTS

| | | | | |
|---|---|---|---|---|
| 5,587,811 | A | * | 12/1996 | Liguori ........................... 358/3.2 |
| 7,471,421 | B2 | * | 12/2008 | Asai et al. ..................... 358/3.06 |
| 7,626,730 | B2 | * | 12/2009 | Tai et al. ....................... 358/3.06 |

* cited by examiner

*Primary Examiner* — Thomas D Lee
*Assistant Examiner* — Stephen M Brinich
(74) *Attorney, Agent, or Firm* — Stanzione & Kim, LLP

(57) ABSTRACT

An apparatus to generate a halftoning screen and an image forming apparatus. The apparatus to generate a halftoning screen includes a dot center setting unit to set locations of dot centers according to a plurality of grey levels of print data, and a screen generating unit to grow dots from the locations of the dot centers that are set for each of the plurality of grey levels of the print data.

23 Claims, 7 Drawing Sheets

APPARATUS AND METHOD TO GENERATE A HALFTONING SCREEN AND IMAGE FORMING APPARATUS FOR SAME

CROSS-REFERENCE TO RELATED APPLICATIONS

This application claims priority under 35 U.S.C. §119 (a) from of Korean Patent Application No. 10-2007-0068730, filed on Jul. 9, 2007, in the Korean Intellectual Property Office, the disclosure of which is hereby incorporated herein in its entirety by reference.

BACKGROUND OF THE INVENTION

1. Field of the Invention

The present general inventive concept relates to an apparatus and a method to generate a halftoning screen, and an image forming apparatus, and more particularly, to an apparatus and a method to generate a halftoning screen capable of reproducing both smooth and detailed tones, and an image forming apparatus to provide the same.

2. Description of the Related Art

Unlike multilevel-based imaging apparatuses, a binary level-based image forming apparatus expresses an image according to the presence and absence of dot output.

Accordingly, a "halftoning" or conversion into a binary level image is necessary, in order to reproduce a multilevel-based image through a binary level-based image forming apparatus.

Among a variety of halftoning methods, screening halftoning converts the grey level gradients 0 to 255 to a binary value by comparing them to a predetermined screen.

Mainly two types of screens are widely used, and these are an amplitude modulated (AM) screen and a frequency modulated (FM) screen. The AM screen outputs a cluster of dots, and thus provides more stable dots than the FM screen. These characteristics of the AM screen, often called a clustered screen, resulting in the screen to be widely adopted in many image forming apparatuses.

The AM screen determines locations of the dot centers and grows the dots with respect to the dot centers. Accordingly, lines per inch (LPI) and angle of a final form of screen table are determined depending on where the dot centers are located.

FIGS. 1A to 1D illustrate examples of a conventional AM screen.

FIG. 1A illustrates an AM screen having 141 LPI, and 232 grey level, and FIG. 1B illustrates an AM screen having 141 LPI and a 106 grey level. FIG. 1C illustrates an AM screen having 212 LPI and a 232 grey level, and FIG. 1D illustrates an AM screen having 212 LPI and a 106 grey level.

Referring to FIGS. 1A to 1D, a conventional AM screen is designed to keep the same LPI value throughout the entire input of grey levels 0 to 255. For example, if 141 LPI is set, all the input grey levels keep 141 LPI, and if 212 LPI is set, then all the input grey levels keep 212 LPI.

In the above example, the AM screen having 141 LPI is suitable to express smooth tone, but is not that efficient to express details. Meanwhile, the AM screen having 212 LPI is suitable fit for expressing details, but is not a good choice to reproduce a smooth tone.

However, users do not have a choice but to select either lower LPI or higher LPI, that is, to select the reproduction of either smooth tone or details.

SUMMARY OF THE INVENTION

The present general inventive concept provides an apparatus and a method to generate a halftoning screen that includes the characteristics to reproduce both the smooth and detailed tones, by adaptively varying the LPI according to the applied level ranges.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing an apparatus to generate a halftoning screen, including a dot center setting unit to set locations of dot centers according to each of a plurality of grey levels of print data, and a screen generating unit to grow dots from the locations of the dot centers that are set for each of the plurality of grey levels of the print data.

The dot center setting unit may include a first dot center setting unit to set the locations of first dot centers that correspond to a first lines per inch (LPI) value, a level range determining unit to determine a plurality of grey level ranges to which to respectively apply the first LPI value and a second LPI value, and a second dot center setting unit to set the locations of second dot centers that correspond to the second LPI.

The screen generating unit may grow the dots from the locations of the first dot centers with respect to the grey levels that are associated with a respective determined grey level range to which to apply the first LPI value, and grows dots from the locations of the second dot centers with respect to the grey levels associated with a respective grey level range to which to apply the second LPI value.

The apparatus to generate a halftoning screen according to an aspect of the present general inventive concept may further include a first dot growth shape determining unit to determine a shape of dot growth in the respective determined grey level range to which to apply the first LPI value, and a second dot growth shape determining unit to determine the shape of dot growth in the respective determined grey level range to which to apply the second LPI value.

The screen generating unit may grow the dots according to the shape of dot growth as determined by the first dot growth shape determining unit with respect to the grey levels that are associated with the grey level range to which to apply the first LPI value, and may grow the dots according to the shape of dot growth as determined by the second dot growth shape determining unit with respect to the grey levels that are associated with the grey level range to which to apply the second LPI value.

The second LPI value may be set to be lower than the first LPI value.

The grey level range to which to apply the first LPI value or the grey level range to which to apply the second LPI value, whichever grey level range has a brighter area, may be set to have a higher LPI value.

The foregoing and other aspects and utilities of the present general inventive concept may also be achieved by providing a method to generate a halftoning screen, including setting locations of dot centers according to a plurality of grey levels of print data, and growing dots from the locations of the dot centers that are set for each of the plurality of grey levels of the print data.

The setting locations of dot centers operation may include setting the locations of first dot centers that correspond to a first lines per inch (LPI) value, determining grey level ranges to which to apply the first LPI value and a second LPI value, and setting the locations of second dot centers that correspond to the second LPI value.

The growing dots operation may include growing dots from the locations of the first dot centers with respect to the grey levels that are associated with the grey level range to which to apply the first LPI value, and growing the dots from the locations of the second dot centers with respect to the grey levels that are associated with the grey level range to which to apply the second LPI value.

The method to generate a halftoning screen according to an aspect of the present general inventive concept may further include determining a shape of dot growth in the determined grey level range to which to apply the first LPI value, and determining a shape of dot growth in the determined grey level range to which to apply the second LPI value.

The growing dots operation may include growing dots according to a shape of dot growth as determined by the first dot growth shape determining unit with respect to the grey levels that are associated with the grey level range to which to apply the first LPI value, and growing dots according to a shape of dot growth as determined by the second dot growth shape determining unit with respect to the grey levels that are associated with the grey level range to which to apply the second LPI value.

In the method, the second LPI value may be set to be lower than the first LPI value.

In the method, the grey level range to which to apply the first LPI value or the grey level range to which to apply the second LPI value, whichever has a brighter area, may be set to have a higher LPI value.

The foregoing and other aspects and utilities of the present general inventive concept may also be achieved by providing an image forming apparatus, including a screen generating unit to generate a screen that has a different lines per inch (LPI) value according to grey levels of print data, and a halftoning unit to perform halftoning using the generated screen.

The screen generating unit may generate a screen to have a higher LPI value for brighter grey levels of the print data, and generate a screen to have a lower LPI value for mid-levels and darker grey levels of the print data.

The foregoing and other aspects and utilities of the present general inventive concept may also be achieved by providing a method of generating a halftoning screen for an image forming apparatus, including setting locations for a plurality of dot centers corresponding to a grouping of grey levels of print data, determining a plurality of dot shapes corresponding to the plurality of set dot centers, and generating a halftoning screen based on the plurality of determined dot shapes.

In the method, each of the set locations for the plurality of dot centers may correspond to a unique grey level range having an associated unique LPI value.

The method may further include growing dots from the locations of the set dot centers according to the determined plurality of dot shapes.

In the method, the determining a plurality of dot shapes may include determining each of the plurality of a dot shapes according to a determined range of grey levels having an associated LPI value.

The foregoing and other aspects and utilities of the present general inventive concept may also be achieved by providing an apparatus to grow a halftoning screen, including a first dot center setting unit to set locations of first dot centers that correspond to a first LPI value, and a second dot center setting unit to set locations of second dot centers that correspond to a second LPI value.

The apparatus to grow a halftoning screen may also include a first dot growth shape determining unit to determine a shape of first dot growth within a grey level to which to apply the first LPI value, and a second dot growth shape determining unit to determine a shape of second dot growth within a grey level to which to apply the second LPI value.

The apparatus to grow a halftoning screen may also include a screen generating unit to grow dots from the locations of the first dot centers that correspond to the first LPI value and to grow dots from the locations of the second dot centers that correspond to the second LPI value.

The foregoing and other aspects and utilities of the present general inventive concept may also be achieved by providing a computer readable recording medium containing a method of generating a halftoning screen for an image forming apparatus, the method including setting locations for a plurality of dot centers corresponding to a grouping of grey levels of print data, determining a plurality of dot shapes corresponding to the plurality of set dot centers, and generating a halftoning screen based on the plurality of determined dot shapes.

The foregoing and other aspects and utilities of the present general inventive concept may also be achieved by providing a computer readable recording medium containing a method of generating a halftoning screen, the method including setting locations of dot centers according to a plurality of grey levels of print data, and growing dots from the locations of the dot centers that are set for each of the plurality of grey levels of the print data.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
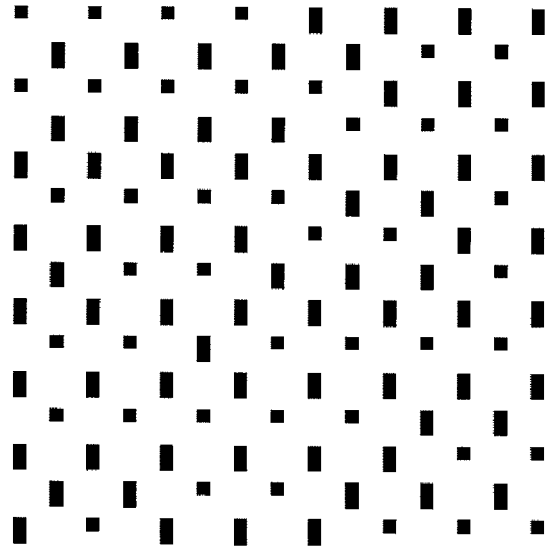
FIGS. 1A to 1D illustrate examples of a conventional amplitude modulated (AM) screen.
Figure 1B:
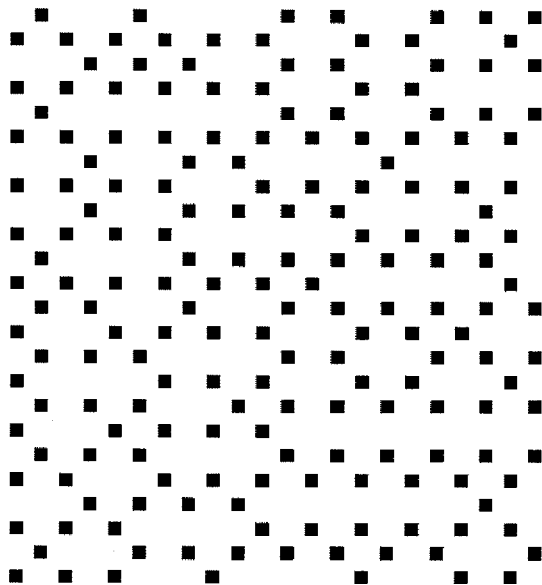
Figure 1C:
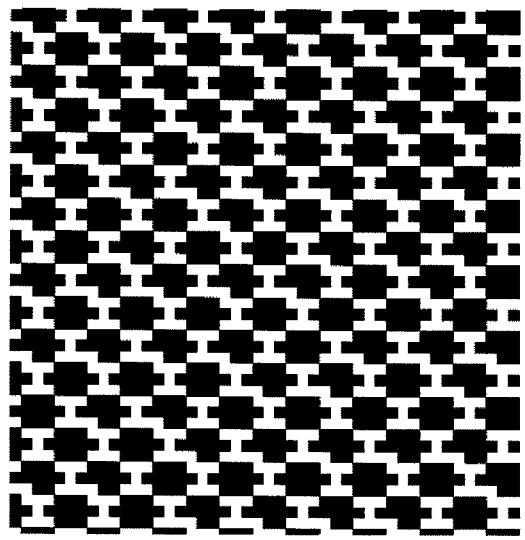
Figure 1D:
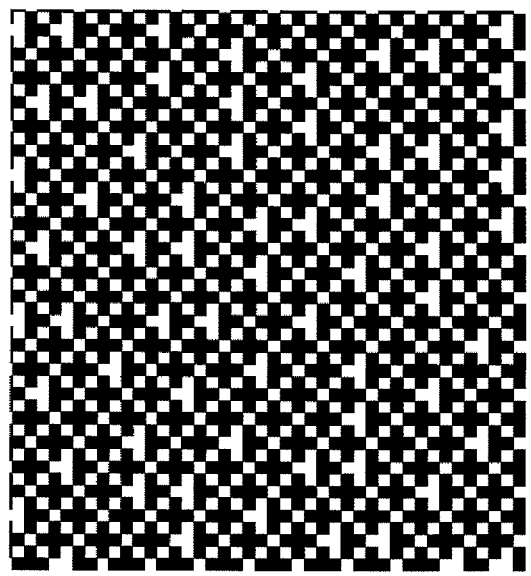

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
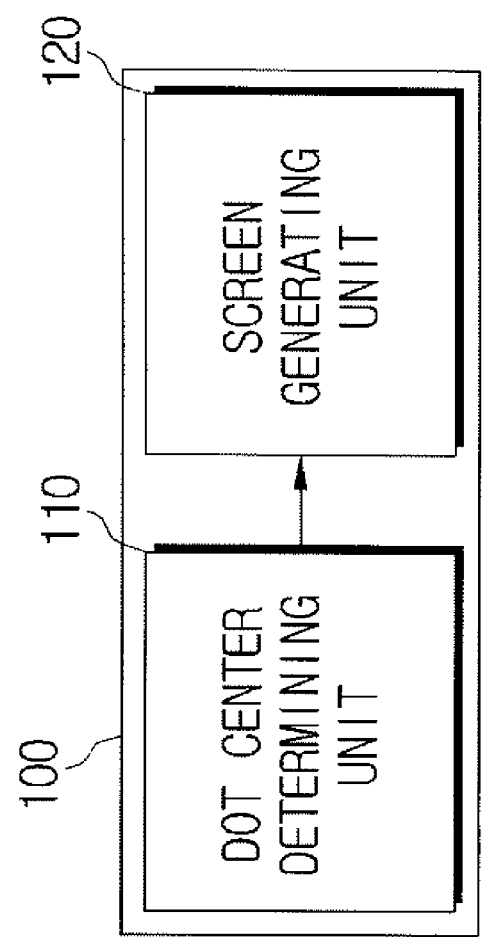
FIG. 2 is a block diagram of an apparatus to generate a halftoning screen according to an exemplary embodiment of the present general inventive concept.

FIG. 2 is a block diagram of an apparatus to generate a halftoning screen according to an exemplary embodiment of the present general inventive concept.

Referring to FIG. 2, the apparatus 100 to generate a halftoning screen includes a dot center determining unit 110 and a screen generating unit 120. In a desirable implementation, the apparatus 100 to generate a halftoning screen may be an image forming apparatus such as a printer, or an external host device, such as a PC, having a printer driver program installed therein.

The dot center determining unit 110 sets the locations of dot centers according to grey levels of print data. The grey levels herein may include 0 through 255. The dot center determining unit 110 may divide the entire grey level into a plurality of sub-levels, and set the locations of the dot centers according to each of the sub-levels. The "dot center" refers to a point from which a dot grows, as described below. The dot center determining unit 110 may set the locations of the dot centers based on a plurality of predetermined LPI values.

The screen generating unit 120 grows the dots based on the locations of the dot centers determined by the dot center determining unit 110 and outputs a halftone screen. That is, the screen generating unit 120 grows the dots based on the locations of the dot centers that are differently set according to the respective grey levels.

Figure 3:
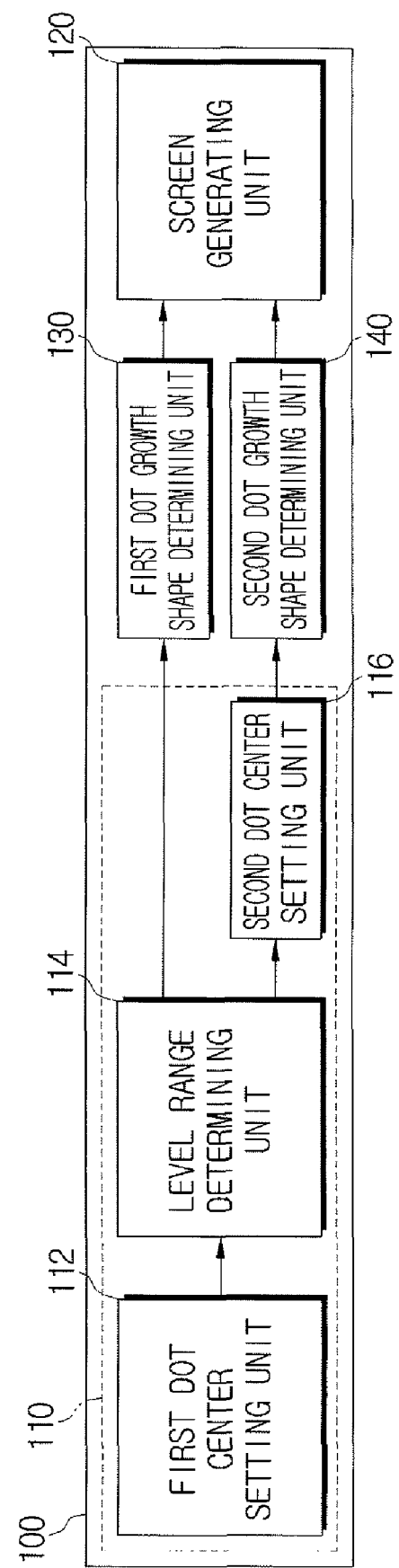
FIG. 3 is a block diagram of an apparatus to generate a halftoning screen according to an additional exemplary embodiment of the present general inventive concept.

FIG. 3 is a block diagram of an apparatus 100 to generate a halftoning screen according to another exemplary embodiment of the present general inventive concept.

Referring to FIG. 3, the apparatus 100 to generate a halftoning screen includes a dot center setting unit 110, a first dot growth shape determining unit 130, a second dot growth shape determining unit 140, and a screen generating unit 120. The like elements of FIG. 3 overlapping with those of the previous embodiment illustrated in FIG. 2 will be referred to by the same reference numerals or symbols.

The dot center setting unit 110 of this embodiment includes a first dot center setting unit 112, a level range determining unit 114, and a second dot center setting unit 116.

The first dot center setting unit 112 sets the location of a first dot center that corresponds to a first LPI value. The first LPI value may be 200 LPI. For example, the first dot center setting unit 112 may set the location of the first dot center based on a 200 LPI value.

The level range determining unit 114 determines grey level ranges to which to apply a first LPI value and a second LPI value from a total of 256 grey levels, numbered from 0 through 255. The level range determining unit 114 may classify the entire grey level range (from 0 through 255) into two sub-ranges, and determine a grey level range for each sub-range to which to apply the first and second values, respectively.

For example, the level range determining unit 114 may determine a range of grey levels 0 through 128 to which to apply the first LPI value, and may determine a range of grey levels 129 through 255 to which to apply the second LPI value.

The second dot center setting unit 116 sets the location of the second dot center that corresponds to the second LPI value. The second LPI value may be 141 LPI. For example, the second dot center setting unit 116 sets the location of the second dot center with reference to the 141 LPI value.

The second dot center setting unit 116 sets dot centers based on a lower LPI value than that of the first dot center setting unit 112. Therefore, gaps between the second dot centers are wider than gaps between the first dot centers.

The first dot growth shape determining unit 130 determines the shape of dot growth within the grey level to which to apply the first LPI value as determined by the level range determining unit 114. If, for example, the first LPI value is set to 200 LPI, the first dot center setting unit 112 sets the location of the first dot center to have a vector of (3, 0) based on 600 dpi.

The second dot growth shape determining unit 140 determines the shape of dot growth within a grey level range to which to apply the second LPI value as determined by the level range determining unit 114. If, for example, the second LPI value is set to 141 LPI, the second dot center setting unit 116 sets the location of the second dot center to have a vector of (3, 3).

The screen generating unit 120 grows the dots from the location of the first dot center as set by the first dot center setting unit 112, with respect to the grey level for that respective grey level range determined by the level range determining unit 114 and the applied first LPI value. The screen generating unit 120 grows the dots according to the shape of dot growth as determined by the first dot growth shape determining unit 130.

The screen generating unit 120 also grows the dots from the location of the second dot center as set by the second dot center setting unit 116, with respect to the grey level for that respective grey level range determined by the level range determining unit 114 and the applied second LPI value. The screen generating unit 120 also grows the dots according to the shape of dot growth as determined by the second dot growth shape determining unit 140.

The first and second LPI values may be set in advance. In one embodiment, it is desirable that the second LPI value is set to be lower than the first LPI value. In this embodiment, it is also desirable that a higher LPI value is applied to the grey levels having a brighter area.

From the grey level range of 0 through 255, grey level 0 has a white value, and grey level 255 has a black value. For example, grey levels 0 through 128 are associated with a relatively bright area, and grey levels 129 through 255 are associated with a relatively darker area.

In the above example, the first LPI value is applied to the grey levels 0 through 128, and the second LPI value, the lower LPI value, is applied to the grey levels 129 through 255.

A higher LPI value is suitable for expressing details, and a lower LPI value is suitable for expressing smooth tone. In other words, a higher LPI value is not advisable to express smooth tone, and a lower LPI value does not express details at high definition.

The screen generating unit 120 grows the dots from the location of the first dot center, which is set based on the first LPI value, that is, based on the higher LPI value, with respect to a determined grey level range having the first LPI value applied thereto. The screen generating unit 120 also grows the dots from the location of the second dot center, which is set based on the second LPI value, that is, based on the lower LPI value, with respect to a determined grey level range having the second LPI value applied thereto. As a result, the screen generating unit 120 outputs the final form of a halftoning screen.

FIGS. 4A to 4D illustrate examples for a method to grow dots depending on the grey level ranges determined by level range determining unit 114 to which to respectively apply a first and a second LPI value.

Figure 4A:
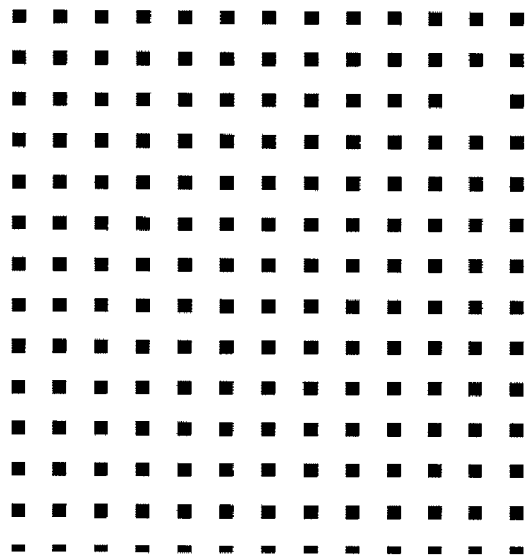
FIGS. 4A to 4D illustrate examples for a method to grow dots depending on grey level ranges and to apply a first and a second LPI.

FIG. 4A illustrates an example of displaying dots in the location of the first dot centers that are set by the first dot center setting unit 112, when the first LPI value is set to 200 LPI. As illustrated in FIG. 4A, some dots may be missing in the first dot centers because the number of dot centers is fixed. This situation is well known in the art and therefore, will not be explained herein in detail for the sake of brevity.

Figure 4B:
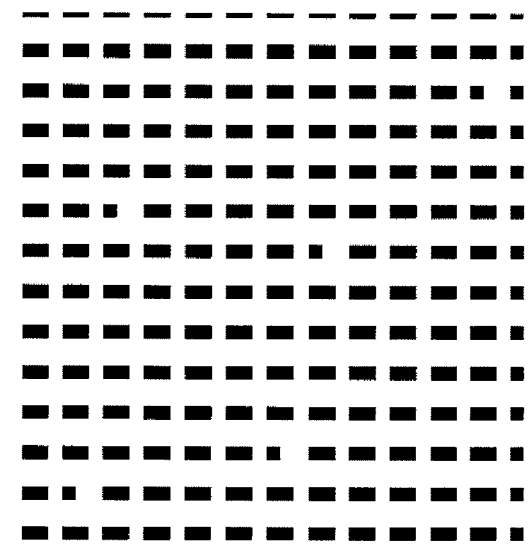

FIG. 4B illustrates an example of a result after the dots of FIG. 4A are grown based on the vector of (3, 0). As illustrated in FIG. 4B, the dot size is doubled after the dots are grown. FIGS. 4A and 4B illustrate an example of a grey level to which the first LPI value, which is a higher LPI value, has been applied.

Figure 4C:
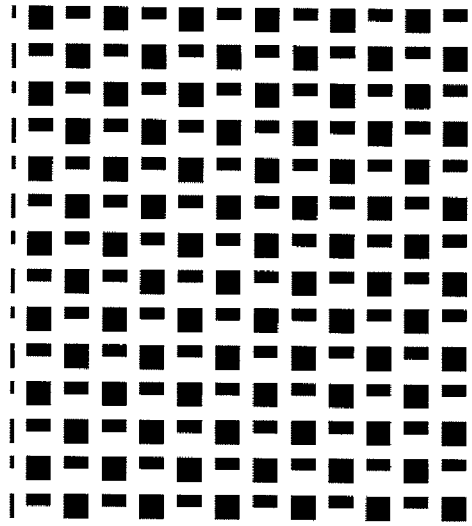
Figure 4D:
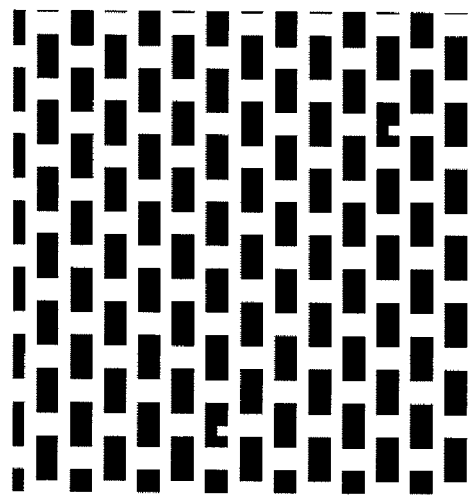

FIG. 4C illustrates an example of a result after growing the dots of FIG. 4B in the location of the second dot centers which are set based on the second LPI value. FIG. 4D illustrates an example of a result after growing the dots of FIG. 4C in the location of the second dot centers which are set based on the second LPI value. FIGS. 4C and 4D illustrate a grey level to which the second LPI value, which is a lower LPI value, has been applied.

Figure 5:
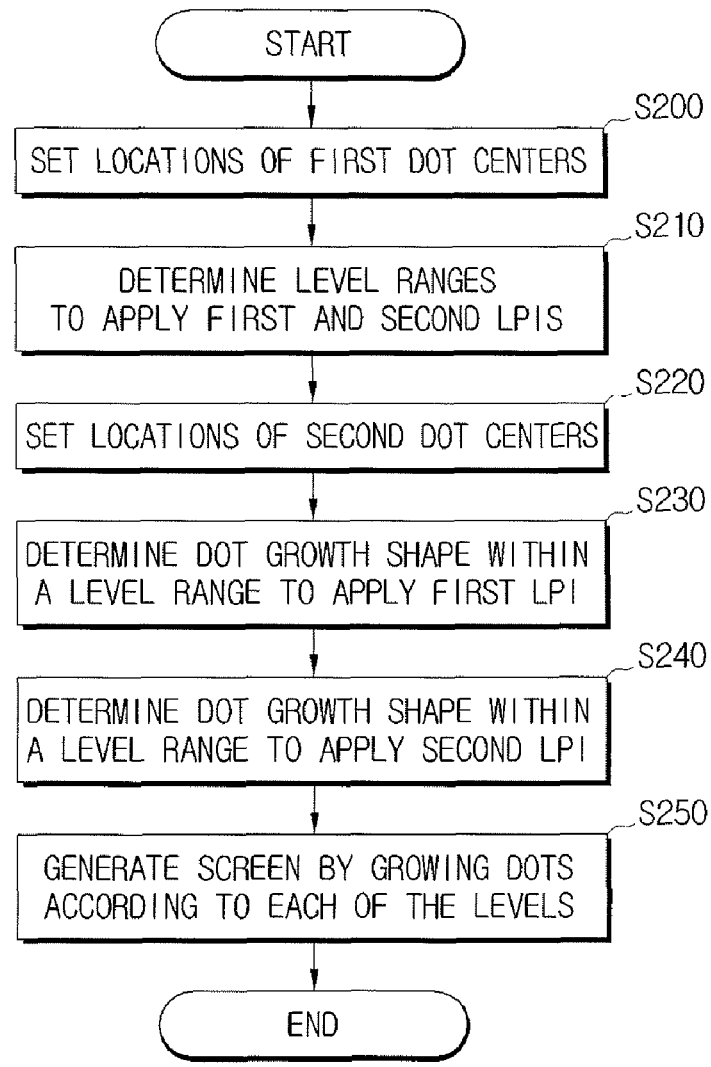
FIG. 5 is a flowchart to illustrate a method to generate a halftoning screen according to an exemplary embodiment of the present general inventive concept.

FIG. 5 is a flowchart to illustrate a method to generate a halftoning screen according to an exemplary embodiment of the present general inventive concept.

A method to generate a halftoning screen according to an exemplary embodiment of the present general inventive concept will be explained below with reference to FIGS. 3 through 5.

At operation S200, the first dot center setting unit 112 sets the locations of the first dot centers that correspond to a first LPI value. The first LPI value is higher than a second LPI value.

At operation S210, the level range determining unit 114 determines a plurality of grey level ranges for grey levels 0 to 255 to which to apply the first and second LPI values, respectively. In this embodiment, the level range determining unit classifies the entire grey level range 0 through 255 into two grey level ranges.

At operation S220, the second dot center setting unit 116 sets the locations of the second dot centers that correspond to the second LPI value. The second LPI value is lower than the first LPI value.

At operation S230, the first dot growth shape determining unit 130 determines a shape of dot growth for the grey levels that belong to the determined grey level range to which to apply the first LPI value. At operation S240, the second dot growth shape determining unit 140 determines a shape of dot growth of grey levels that belong to the determined grey level range to which to apply the second LPI value.

At operation S250, the screen generating unit 120 grows the dots based on the locations of the first dot centers, with respect to the grey levels associated with the level range to which the first LPI value has been applied, grows the dots based on the locations of the second dot centers, with respect to the grey levels associated with the level range to which the second LPI value has been applied, and outputs the final form of a halftoning screen.

As a result, the drawbacks of the conventional AM screen, that is, use of a fixed LPI value for the entire screen and subsequent inability to represent both the details and the smooth tone at the same time, are solved.

Figure 6:
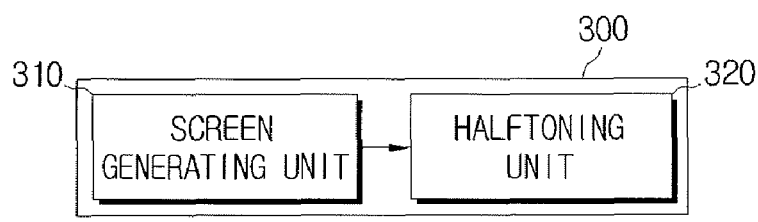
FIG. 6 is a block diagram of an image forming apparatus according to an exemplary embodiment of the present general inventive concept.

FIG. 6 is a block diagram of an image forming apparatus 300 according to an exemplary embodiment of the present general inventive concept.

Referring to FIG. 6, the image forming apparatus 300 includes a screen generating unit 310, and a halftoning unit 320.

The screen generating unit 310 generates a screen that has different LPI values according to the grey levels of print data. Accordingly, the screen generating unit 310 generates a screen that has a higher LPI value for brighter grey levels of print data, and a lower LPI value for mid-levels and darker grey levels of print data. The screen generating unit 310 may have similar functions as the screen generating unit 120 of the apparatus 100 to generate a halftoning screen illustrated in FIG. 3.

The halftoning unit 320 performs halftoning, using a screen generated by the screen generating unit 310. The halftoning unit 320 converts a multi-level image into a binary level image, using a screen that has different LPI values according to grey levels of the print data.

The image forming apparatus 300 is capable of representing both the details and the smooth tone of an image, by halftoning the print data using a screen that has different LPI values according to grey levels of the print data.

With an apparatus and a method to generate a halftoning screen, and an image forming apparatus according to the exemplary embodiments of the present general inventive concept, grey level ranges to which to apply first and second LPI values are classified, and dot centers are then applied differently according to the classification of the grey level ranges. As a result, details are well represented in a bright region, and smooth tone is efficiently expressed in a dark region.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An apparatus to generate a halftoning screen, comprising:
   a dot center setting unit to set locations of dot centers according to each of a plurality of grey levels of print data comprising:
      a first dot center setting unit to set the locations of first dot centers that correspond to a first lines per inch (LPI) value;
      a level range determining unit to determine a plurality of grey level ranges to which to respectively apply the first LPI value and a second LPI value; and
      a second dot center setting unit to set the locations of second dot centers that correspond to the second LPI;
   a screen generating unit to grow dots from the locations of the dot centers that are set for each of the plurality of grey levels of the print data.

2. The apparatus of claim 1, wherein the screen generating unit grows dots from the locations of the first dot centers with respect to the grey levels that are associated with a respective determined grey level range to which to apply the first LPI value, and grows dots from the locations of the second dot centers with respect to the grey levels associated with a respective determined grey level range to which to apply the second LPI value.

3. The apparatus of claim 1, further comprising:
a first dot growth shape determining unit to determine a shape of dot growth in the respective determined grey level range to which to apply the first LPI value; and
a second dot growth shape determining unit to determine a shape of dot growth in the respective determined grey level range to which to apply the second LPI value.

4. The apparatus of claim 3, wherein the screen generating unit grows the dots according to the shape of dot growth as determined by the first dot growth shape determining unit with respect to the grey levels that are associated with a the grey level range to which to apply the first LPI value, and grows the dots according to the shape of dot growth as determined by the second dot growth shape determining unit with respect to the grey levels that are associated with, the grey level range to which to apply the second LPI value.

5. The apparatus of claim 1, wherein the second LPI value is set to be lower than the first LPI value.

6. The apparatus of claim 1, wherein the grey level range to which to apply the first LPI value or the grey level range to which to apply the second LPI value, whichever grey level range has a brighter area, is set to have a higher LPI value.

7. A method to generate a halftoning screen, comprising:
setting locations of dot centers according to a plurality of grey levels of print data;
setting the locations of first dot centers that correspond to a first lines per inch (LPI) value;
determining grey level ranges to which to apply the first LPI value and a second LPI value;
setting the locations of second dot centers that correspond to the second LPI value; and
growing dots from the locations of the dot centers that are set for each of the plurality of grey levels of the print data.

8. The method of claim 7, wherein the growing dots comprises:
growing dots from the locations of the first dot centers with respect to the grey levels that are associated with the grey level range to which to apply the first LPI value; and
growing dots from the locations of the second dot centers with respect to the grey levels that are associated with the grey level range to which to apply the second LPI value.

9. The method of claim 7, further comprising:
determining a shape of dot growth in the determined grey level range to which to apply the first LPI value; and
determining a shape of dot growth in the determined grey level range to which to apply the second LPI value.

10. The method of claim 9, wherein the growing dots comprises:
growing dots according to a shape of dot growth as determined by the first dot growth shape determining unit with respect to the grey levels that are associated with the grey level range to which to apply the first LPI value; and
growing dots according to a shape of dot growth as determined by the second dot growth shape determining unit with respect to the grey levels that are associated with the grey level range to which to apply the second LPI value.

11. The method of claim 7, wherein the second LPI value is set to be lower than the first LPI value.

12. The method of claim 7, wherein the level range to which to apply the first LPI value or the level range to which to apply the second LPI value, whichever has a brighter area, is set to have a higher LPI value.

13. An image forming apparatus, comprising:
a screen generating unit to generate an amplitude modulated halftoning screen that has a different lines per inch (LPI) value according to grey levels of print data; and
a halftoning unit to perform halftoning using the generated amplitude modulated halftoning screen.

14. The image forming apparatus of claim 13, wherein the screen generating unit generates a screen to have a higher LPI value for brighter grey levels of the print data, and generates a screen to have a lower LPI value for mid-levels and darker grey levels of the print data.

15. A method of generating a halftoning screen for an image forming apparatus, comprising:
setting locations for a plurality of dot centers corresponding to a grouping of grey levels of print data;
determining a plurality of dot shapes corresponding to the plurality of set dot centers; and
generating a halftoning screen based on the plurality of determined dot shapes.

16. The method of claim 15, wherein each of the set locations for the plurality of dot centers corresponds to a unique grey level range having an associated unique LPI value.

17. The method of claim 16, further comprising:
growing dots from the locations of the set dot centers according to the determined plurality of dot shapes.

18. The method of claim 15, wherein the determining a plurality of dot shapes includes determining each of the plurality of a dot shapes according to a determined range of grey levels having an associated LPI value.

19. An apparatus to grow an amplitude modulated halftoning screen, comprising:
a first dot center setting unit to set locations of first dot centers that correspond to a first LPI value; and
a second dot center setting unit to set locations of second dot centers that correspond to a second LPI value.

20. The apparatus of claim 19, further comprising:
a first dot growth shape determining unit to determine a shape of first dot growth within a grey level to which to apply the first LPI value; and
a second dot growth shape determining unit to determine a shape of second dot growth within a grey level to which to apply the second LPI value.

21. The apparatus of claim 19, further comprising:
a screen generating unit to grow dots from the locations of the first dot centers that correspond to the first LPI value and to grow dots from the locations of the second dot centers that correspond to the second LPI value.

22. A non-transitory computer readable recording medium containing a method of generating a halftoning screen for an image forming apparatus, the method comprising:
setting locations for a plurality of dot centers corresponding to a grouping of grey levels of print data;
setting the locations of first dot centers that correspond to a first lines per inch (LPI) value;
determining grey level ranges to which to apply the first LPI value and a second LPI value;
setting the locations of second dot centers that correspond to the second LPI value;
determining a plurality of dot shapes corresponding to the plurality of set dot centers; and
generating a halftoning screen based on the plurality of determined dot shapes.

23. A non-transitory computer readable recording medium containing a method of generating a halftoning screen, the method comprising:
setting locations of dot centers according to a plurality of grey levels of print data;
setting the locations of first dot centers that correspond to a first lines per inch (LPI) value;
determining grey level ranges to which to apply the first LPI value and a second LPI value;
setting the locations of second dot centers that correspond to the second LPI value; and
growing dots from the locations of the dot centers that are set for each of the plurality of grey levels of the print data.

* * * * *